United States Patent [19]

Ludwig et al.

[11] Patent Number: 4,880,103
[45] Date of Patent: Nov. 14, 1989

[54] PRESSURELESS CONVEYOR FOR BOTTLES OR SIMILAR ITEMS

[75] Inventors: Marcel Ludwig, La Wantzenau; Robert Schoen, Ostwald; Othon Elchinger, Roeschwoog, all of France

[73] Assignee: Gebo, Reichstett, France

[21] Appl. No.: 103,706

[22] Filed: Oct. 2, 1987

[30] Foreign Application Priority Data

Oct. 3, 1986 [FR] France ................. 86 13909

[51] Int. Cl.⁴ .............................................. B65G 47/26
[52] U.S. Cl. .................................... 198/434; 198/442
[58] Field of Search ............................. 198/442, 434

[56] References Cited

U.S. PATENT DOCUMENTS

| | | | |
|---|---|---|---|
| 1,263,146 | 4/1918 | Taliaferro | 198/442 |
| 1,719,897 | 7/1929 | Mayo | 198/442 |
| 1,742,239 | 1/1930 | Dotson | 198/442 |
| 2,627,334 | 2/1953 | Koppel et al. | 198/442 X |
| 4,308,944 | 1/1982 | Probst | 198/442 |

FOREIGN PATENT DOCUMENTS 2627277 12/1977 Fed. Rep. of Germany ...... 198/442

Primary Examiner—Robert J. Spar
Assistant Examiner—D. Glenn Dayoan
Attorney, Agent, or Firm—Sandler & Greenblum

[57] ABSTRACT

A pressureless conveyor for objects, bottles or similar items, including an input conveyor having single-channel paddle chains, a slowdown conveyor having a guide ramp, and an output conveyor with multiple juxtaposed channels. This conveyor includes a distribution system attached to the slowdown conveyor guide ramp for, imparting a serpentine path to the bottles on the output conveyor. More particularly, this distribution system transforms the straight-line motion of the bottles on the slowdown conveyor into an alternating movement combined with the progression of the different paddle chains of the output conveyor. This results in the distribution of the bottles over the entire working surface of the output conveyor.

5 Claims, 1 Drawing Sheet

PRESSURELESS CONVEYOR FOR BOTTLES OR SIMILAR ITEMS

BACKGROUND OF THE INVENTION

1. Field of the Invention

The present invention is directed to a pressureless conveyor objects, bottles or similar items, comprising an input conveyor having single-channel paddle chains, a slowdown conveyor having a guide ramp, and an output conveyor with multiple juxtaposd channels having paddle chains.

This conveyor is designed to transfer bottles which are coming from one machine, (for example: a capping machine), to another machine situated downstream. This conveyor is particularly useful whenever a buffer stock is necessary at the entry of a machine for treating bottles, receptacles, or similar objects.

2. Discussion of Background and Material Information

Conveyors allowing buffer stocking of receptacles or bottles from processing machines, traveling on single-channel paddle chains already exist. At the end of the input conveyor, bottles arrive on a slowdown conveyor which groups these bottles. This slowdown conveyor is composed of a number of juxtaposed paddle chains, moved by differential speed mechanisms, with a guide ramp above this slowdown conveyor directing bottles from one chain to another. The bottles released at a regular interval from the upstream processing machine are then placed in contact behind each other and directed towards a multiple-channel output conveyor. On arrival, the bottles are given a straight-line motion and line up more or less behind each other on the output conveyor. Frequently, for spatial reasons, this output conveyor must be of limited length. To prepare an adequate buffer stock, bottles must be distributed across its entire working surface. This distribution of bottles behind each other, across the entire width of the output conveyor, can only be done by imparting a high speed to output conveyor paddle chains. Thus, by high speed collisions the bottles push one another, and distribute themselves across the width of the output conveyor.

This type of system has a certain number of disadvantages. As the rhythm of production increases, more rapid bottle distribution over the whole output conveyor working surface becomes necessary. Poor distribution promptly results in bottle accumulation at the upstream machine exit, at the level of the input conveyor, and subsequent production halts. Distribution speed is dependent on collision shock effects between the different bottles. To increase collision shock effects, it is necessary to increase the output conveyor paddle chain advancement speed. This results in numerous major drawbacks, notably a large number of bottles are knocked over, requiring frequent operator intervention. Other disadvantages include high noise levels and bottle breakage due to the collision shock, etc.

Another existent system is available to widen and slow down batches of upright bottles or similar items. This system consists of a single-channel input conveyor emerging on a laterally inclined intermediary conveyor which slows down and groups the bottles. At the intermediary conveyor exit, bottles enter a three-channel output conveyor filling the entire working surface. Thanks to better bottle distribution, obtained without pressure, output conveyor paddle chains run at a lower progression speed. However, distribution conditions optimal it is questionable whether the.

Unfortunately, the inclined plane, essentially composed by the intermediary conveyor, has a certain number of drawbacks. Bottle movement simply driven by gravity is totally inconsistent, since it is dependent on the friction coefficient, which varies as a function of bottle bottom roughness and conveyor surface irregularities. Moreover, the angle of inclination of the intermediary conveyor is a function not only of the type of recipients transported, but their weight as well. Therefore the conveyor will have a given angle of inclination depending on whether the bottles moved are empty or full. Many factors must be taken into account to determine the slope of the inclined plane.

Another disadvantage of this system which should not be overlooked is the increased risk of bottles falling from the intermediary conveyor. This disadvantage is compounded by the fact that a bottle falling from the upper section of the intermediary conveyor will knock over all the bottles situated downstream.

It should also be noted that bottle distribution depends on the length of the inclined plane, so the more output conveyor channels there are, the longer the intermediary conveyor must be.

SUMMARY OF THE INVENTION

The goal of the present invention is to propose a pressureless conveyor for bottles or similar items alleviating the disadvantages mentioned above.

To achieve this goal, the invention concerns a pressureless conveyor for bottles or similar items or objects, which includes an input conveyor with single-channel paddle chains, a slowdown conveyor with guide ramp, and an output conveyor with multiple juxtaposed channels. This system is characterized by the fact that the bottles, at the output conveyor level, follow a serpentine path imparted by the distribution system which transforms the uniform straight-line motion of the bottles from the input conveyor into an alternating movement combined with the progression of the different paddle chains of the output conveyor.

This invention has a number of advantages. Better distribution of aligned bottle flow from a processing machine, such as a filling machine or similar device, on the output conveyor allows a substantial reduction in the speed of the output conveyor paddle chains. This results in sharply decreased working noise levels, as well as decreased recipient material fatigue. Bottle distribution is not subject to the series of drawbacks like in the prior art above, therefore conveyor length can be reduced while increasing the number of output conveyor channels. Moreover, since the system is not dependent on variable recipient characteristics such as weight, shape, or roughness, it can be used for any type of recipient. Another advantage is reduced operator intervention to right fallen bottles.

BRIEF DESCRIPTION OF THE DRAWINGS

The invention can easily be understood by referring to the following description, prepared as a nonlimitary example, and the attached drawing in which.

DETAILED DESCRIPTION

Figure 1:
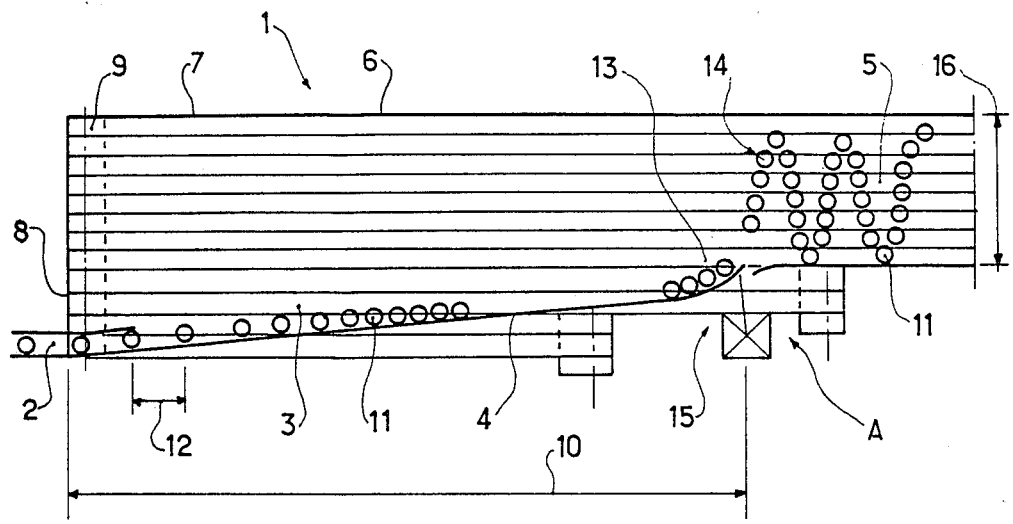
FIG. 1 is a flat view of a recipient conveyor according to the invention.
Figure 2:
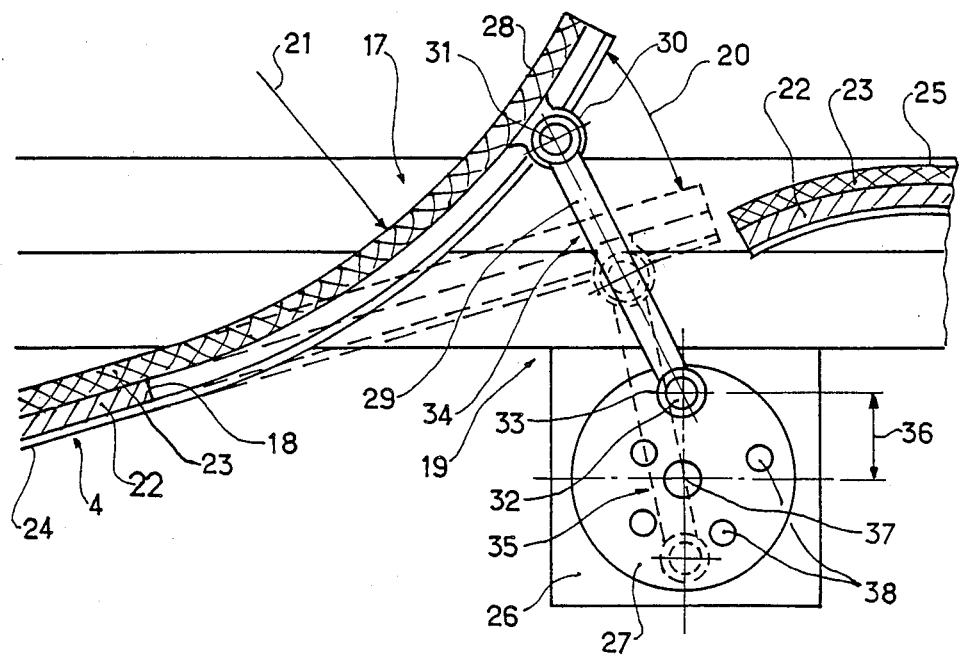
FIG. 2 is an enlarged view of the portiion of FIG. 1 marked 'A'.

The following refers to FIGS. 1 and 2.

Conveyor 1 is installed between two machines for processing liquids in recipients or receptacles, such as bottles, to handle pressureless bottle progression. It is composed of a single-channel paddle chain input conveyor 2, a slowdown conveyor 3 with a guide ramp 4 on one side, and a juxtaposed multiple-channel output conveyor 5 with a second guide ramp 6 parallel to the longitudinal edge 7 of the output conveyor 5.

The input conveyor 2, coming from a bottle processing machine (not depicted), such as bottle filler or other device, extends to the upstream extremity 8 of the slowdown conveyor 3, which transits or transfers bottles from the input conveyor 2 to the output conveyor 5. In FIG. 1, depicting an implementation scheme for the present invention, the output conveyor is not situated at the exit of the slowdown conveyor 3; instead it extends to the slowdown conveyor's upstream extremity 8. Thus, the group of paddle chains constituting the slowdown conveyor 3 and the output conveyor 5 partially coil around the same return drum 9, at the upstream extremity 8 of the slowdown conveyor 3. The length 10 of this subsystem can vary.

The input conveyor 2 feeds bottles 11 to the slowdown conveyor 3 at regular intervals 12. Interval lengh depends on the cadence of the upstream machine. To eliminate the interval 12 between bottles 11, the slowdown conveyor 3 is made up of a number of paddle chains with graded progression speeds. Thus, rapidly moving bottles from the input conveyor 2 join the bottles progressing toward the exit end 13 of the slowdown conveyor 3 at reduced speed. The guide ramp 4 on the slowdown conveyor 3 directs the bottles 11 from one paddle chain to another whose speed is less.

Note that bottles 11 exert thrust on each other at the level of the exit extremity 13 of the slowdown conveyor 3, ejecting them on the output transporter 5.

According to one characteristic of the present invention, at the level of the output conveyor 5, bottles 11 follow a serpentine path 14 due to the transformation, by the distribution system 15, of the uniform straight-line progression of bottles 11 from the input conveyor 2 into an alternating movement combined with the progression of the different output conveyor 5 chains.

According to a preferential implementation scheme for the present invention, conveyor 1 includes a guide ramp with a distribution system 15, spreading bottles 11 over the entire working surface 16 of the output conveyor 5. By distributing the bottles 11 over the entire working surface 16 of the output conveyor 5, the output conveyor paddle chains can progress at reduced speed, contrary to bottles 11 distribution resulting from the state-dependent earlier technique. This speed reduction allows a sharp decrease in working noise levels and glass fatigue when bottles 11 are grouped.

According to an implementation scheme for the present invention, the guide ramp with the pressureless distribution system 15 corresponds to guide ramp 4 of slowdown conveyor 3. The pressureless distribution system 15 consists of a curved segment 17 situated at the extremity 18 of guide ramp 4 and a mechanical subsystem 19 which gives this curved segment 17 a certain stroke 20 (see FIG. 2).

The ejection trajectory of bottles 11 from slowdown conveyor 3 on output conveyor 5 depends on the curve radius 21 curved segment 17, at the moment of ejection.

Thus, variation in each bottle's 11 ejection trajectory, exiting the slowdown conveyor 3, is obtained by varying the curve radius 21 of the curved segment 17 of guide ramp 4. This curve radius 21 variation is obtained by the mechanical subsystem 19. As the curve radius 21 of curved segment 17 increases, the angle between the bottle 11 ejection trajectory at the slowdown transporter 3 exit and the output conveyor 5 paddle chains' direction of movement decreases. On the other hand, as curve radius 21 decreases, this angle increases and bottles 11 will tend to approach the guide ramp 6 parallel to the longitudinal edge 7 of the output conveyor 5. This transformation of uniform stright-line bottle 11 progression on the slowdown conveyor 3 into an alternating movement combined with the progression of the different output conveyor 5 paddle chains results in the serpentine form 14 of these bottles' 11 position on the output conveyor, as can be seen in FIG. 1.

According to a preferred embodiment or implementation scheme for the present invention, the curved segment 17 is made of a flexible material placed in the extension of guide ramp 4. Generally, guide ramps 4 and 6 are made up of a metallic reinforcement 22, covered with a protective sheath 23 of flexible plastic. The curved segment 17 consists of an extension of this. This setup avoids any surface irregularities at the junction, at the extremity 18 of guide ramp 4, or with curved segment 17. According to a special implementation scheme, guide ramp 4 consists of an oblique segment 24 and a straight segment 25, parallel to the guide ramp 6 of the output transporter 5. The curved segment 17 is constructed by cutting this guide ramp 4 at the exit extremity 13 of the slowdown transporter 3 and shortening the metal reinforcement 22 of the oblique segment 24 of the guide ramp 4 by a length equivalent to that of curved segment 17. It is obvious that any other method for implementing these last items can be considered without leaving the framework and spirit of the present invention.

According to another characteristic of the present invention, the mechanical subsystem 19 which imparts a certain stroke 20 to curved segment 17 is made up of a motor element 26 which rotates disk 27 attached to the extremity 28 of the curved segment 17 by a connecting rod 29. The link between the curved segment 17 and the connecting rod 29 extremity 30 is done by an articulation 31. Another mobile articulation 32 links the connecting rod 29 extremity 33 to disk 27. Thus, when the motor 26 rotates disk 27, the connecting rod 29 extremity 30 moves, with a basically back-and-forth movement, displacing the extremity 28 of the curved segment 17 by the stroke 20. FIG. 2 depicts the distribution system 15 in two positions 34 and 35 corresponding to the extreme positions of connecting rod 29. When connecting rod 29 is in position 34, the curve radius 21 of curved segment 17 is at its minimum value. The maximum value of curve radius 21 is reached when connecting rod 29 is in position 35.

The amplitude of the back-and-forth movement of the connecting rod 29 extremity 30 depends on the length 36 of the distance separating the mobile articulation axis 32 and the rotation axis 37 of disk 27, which acts as a crank.

To be able to adapt this distribution system 15 to conveyors 1 with different characteristics, such as width or pallet chain progression speed, as well as to different types of receptacles, it is necessary to be able to modify the amplitude and working speed of the connecting rod 29 extremity's 30 back-and-forth movement, and the resulting curved segment 17 stroke 20. To do so, according to a characteristic of the present invention, disk 27 has fixation points 38 situated on circles concentric to the rotation axis 37. Thus, these fixation points 38 allow the crank length 36 to be varied, and the resulting curved segment 17 stroke 20 amplitude.

Moreover, conveyors 1 run in a transitional phase at certain times, such as when the installation is started up or shut down. In this case, the distribution system 15 must function in step with the variable paddle chain progression speeds of the different conveyors. To achieve this, the motor element 26, according to another characteristic of the present invention, is a variable speed motor with a servomechanism to adapt rotation speed, and the resulting stroke 20 frequency, to the variable speed of conveyor 1 paddle chain progression.

According to another embodiment or implementation scheme, the mechanical subsystem giving a certain stroke 20 to curved segment 17 is composed of a hydraulic or pneumatic jack attached to the extremity 28 of curved segment 17. This hydraulic or pneumatic jack can also have a servomechanism to adapt the frequency of stroke 20 to the speed of the conveyor 1 paddle chain progression.

The overall characteristics of the present invention will allow a very reliable conveyor with a considerbly lower working noise level. Moreover, thanks to distribution by mechanical means as opposed to gravity, conveyor 1 can be shorter and can be used in any type of installation requiring the transfer or conveyance of bottles or other objects, and is particularly suitable in those systems with buffer stock preparation between two machines.

We claim:

1. A pressureless conveyor for objects comprising a single-channel input conveyor, a slowdown transporter operably connected to said input conveyor, said slowdown transporter being provided with a guide rail, and a juxtaposed multiple-channel output conveyor wherein said guide rail of said slowdown transporter includes a distribution system for transforming straight-line object progression imported by said input conveyor, into a lateral movement combined with progressive movement of said multi-channel output conveyor whereby objects conveyed by said slowdown transporter touch each other before being distributed in a serpentive path over an entire working surface of said output conveyor, said distribution system comprising a curved segment of said guide rail set on said slowdown transporter and a mechanical subsystem for imparting oscillating movement to said curved segment comprising a variable speed motor for rotating a disk about a rotation axis of the disk, a connecting rod having one end rotatably mounted to one of a plurality of fixation points located on said disk concentrically with respect to said rotation axis and another end linked to an extremity of said curved segment whereby frequency and amplitude of a stroke on said curved segment may be varied.

2. The pressureless conveyor as in claim 1, wherein said curved segment of said guide rail comprises an extension of a protective sheath of flexible material of said guide rail.

3. The pressureless conveyor as in claim 1, wherein said variable speed motor comprises a servomechanism for coordinating said frequency of said stroke on said curved segment to the progressive movement of the output conveyor.

4. A conveyor for objects comprising:
 (a) an input conveyor for imparting straight-line progression to objects being conveyed;
 (b) a slowdown transporter located downstream of said input conveyor;
 (c) an output conveyor juxtaposed with respect to said slowdown transporter for imparting progressive movement to objects being conveyed;
 (d) means for guiding positioned adjacent said slowdown transporter for operably communicating between said input conveyor and said output conveyor, said means for guiding comprising a distribution system for transforming said straight-line progression of said input conveyor into a combination of lateral movement and progressive movement of said output conveyor so as to cause objects being conveyed to contact each other before being distributed in a serpentive path over a substantial portion of a surface of said output conveyor, said distribution system comprising:
 (i) a curved segment as an extension of said means for guiding, and
 (ii) means for imparting oscillating movement to said curved segment, comprising a variable speed motor operably connected to a rotatable disk having a plurality of fixation points arranged concentrically with respect to an axis of rotation of said disk, and a rod having one end rotatably mounted to one of said fixation points and another end linked to an end of said curved segment for moving said curved segment, whereby amplitude and frequency of the oscillating movement imparted to said curved segment maybe varied by connecting said one end of said rod to a different one of said fixation points.

5. The conveyor as defined by claim 4, wherein said variable speed motor comprises a servomechanism for coordinating the frequency of the oscillating movement imparted to said curved section to the progressive movement of said output conveyor so as to transform said straight-line progression into said serpentine path.

* * * * *